United States Patent Office

Re. 23,904

Reissued Dec. 14, 1954

23,904

SUBSTITUTED ARALKYL ALKYLENE DI-AMINO DI-ACETIC ACIDS AND SALTS

Frederick C. Bersworth, Verona, N. J.

No Drawing. Original No. 2,624,757, dated January 6, 1953, Serial No. 193,543, November 1, 1950. Application for reissue August 17, 1953, Serial No. 374,838

6 Claims. (Cl. 260—518)

Matter enclosed in heavy brackets [ ] appears in the original patent but forms no part of this reissue specification; matter printed in italics indicates the additions made by reissue.

This invention relates to chelating agents for metal ions in aqueous and organic solvent solutions and has for its object the provision of a heavy metal ion chelating agent which is active also as a bactericidal and fungicidal agent.

Another object is to provide a chelating agent for heavy metal ions which is soluble in organic solvents as well as in aqueous solutions.

A further object is to provide new type heavy metal chelating agents.

Other objects will be apparent as the invention is more fully hereinafter disclosed.

In accordance with these objects I have discovered that alkylene polyamino acids conforming to the general structural formula—

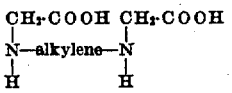

wherein alkylene represents ethylene, propylene or trimethylene, which heretofore have been generally recognized for their chelating properties towards metal ions in aqueous solutions, are modified structurally such as to displace each of the remaining hydrogens of each amino [nitrogen group with an alkylene group, and a substituted phenyl derivative of this compound is formed which conforms to the general structure:] *nitrogen group with an aralkyl group, substituted phenyl derivatives of the compounds are formed which conform to the general structure*:

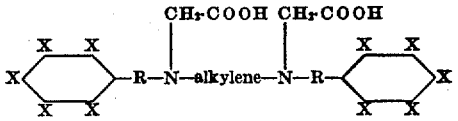

where X=hydrogen, alkyl, halogen, hydroxyl or alkoxyl; where R represents an alkylene radical or an alkylene radical containing ether linkages, the resulting polyamino polycarboxylic [acid acquires] *acids acquire* solubility in organic solvents as well as bactericidal and fungicidal properties in aqueous solutions and [retains] *retain* strong chelating properties towards heavy metal ions in aqueous as well as in organic solvent solutions.

The compounds described are all soluble in water in the form of their alkali metal, ammonia or amine salts. They are not soluble as the acids in water media but are soluble in organic solvents. The amine salts are also highly soluble in organic solvents. The chelates are soluble in organic solvents being non-ionic.

This solubility may be modified particularly as to water systems by means of sulfonation in the aromatic ring and/or alkyl sulfonation in accordance with known means to form soap-like products.

There are a large number of compounds conforming to this general structure given above and the compounds may include mono or poly halogenated, alkylated, and hydroxylated phenyl groups without departure from the invention. As specific examples of the compounds within the scope of the invention the following are given by way of illustration and not by way of limitation.

EXAMPLE I

Two moles of 2,6-dichloro-4-nitrobenzyl chloride are gradually added over a 3 hour period to a 50% ethanol solution of one mole of the disodium salt of ethylene diamine diacetic acid which is rapidly stirred and heated to reflux. The reaction solution is stirred and heated for 4 hours after the addition is complete. Evaporation of the alcohol and cooling the solution results in [the precipitation N,N'(2,6 dichloro-4-nitro-] *the precipitation of N,N'-(2,6-dichloro-4-nitro-benzyl)* ethylene diamine diacetic acid as the solid monohydrate. The product is believed to have the formula:

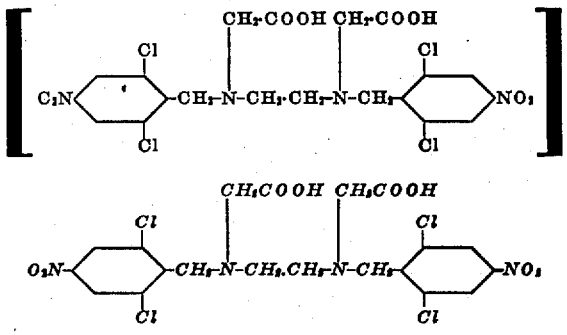

For example, the $NO_2$ group in the aromatic nucleus may be reduced to an amino group, which may then be diazotized and converted to a halogen by means of the Sandmeyer reaction. Also, the diazonium salt may be hydrolyzed to a phenolic group by well-known methods.

The amino hydrogens of the phenyl amino group may be substituted by various functional groups, such as acetic acid groups to further modify the properties of the compound.

The aromatic [group] *groups* may also be further modified by substitution on *the* aromatic [ring] *rings* by known reactions to give derivatives thereof which are valuable chelating agents.

EXAMPLE II

The diazonium salt of Example I is treated with cuprous chloride and excess alkali chloride (Sandmeyer reaction), in the usual manner, except that a molar amount of cupric ion is used to take care of the tendency of the amino acid to combine with copper. The resulting compound is a chelate of copper, which may be separated from the metal in ethanol solution by treatment with excess $H_2S$. The resulting acid may be crystallized on evaporation of the solvent, and is believed to have the formula:

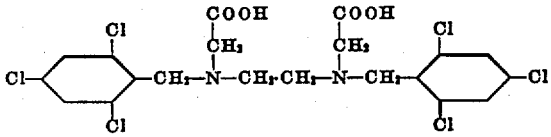

EXAMPLE III

The product of Example II may also be obtained [by condensing 2,4,6 trichlorobenzyl chloride with ethylene diamine, N,N' diacetic acid disodium salt as described in the first step of example.] *by condensing 2,4,6-trichlorobenzyl chloride with ethylene diamine-N,N'-diacetic acid disodium salt as described in the first step of Example I.* Acidification of the reaction mixture yields the desired product as a crystalline substance.

EXAMPLE IV

Two moles of p-chlorophenylethyl chloride, $ClC_6H_5CH_2CH_2Cl$ is treated with an aqueous solution of one mole of disodium ethylene diamine diacetate as described in Example I. On acidification of the reaction mixture the following substance is obtained in crystallizable form:

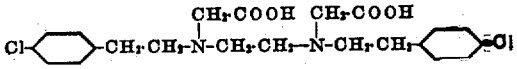

EXAMPLE V

Two moles of 2-hydroxy-3,6-dichlorobenzyl chloride dissolved in ethanol are gradually added to a gently refluxing solution of one mole of ethylene diamine in 50% ethanol. The addition is made over a 3-hour period, the solution being maintained alkaline by gradual addition of one mole of $Na_2CO_3$. After complete addition, the reaction mixture is refluxed for one hour and an excess of water is added. The di-substituted diamine, having the formula:

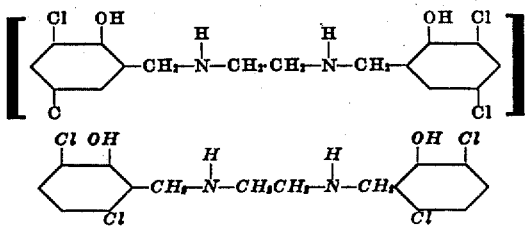

precipitates from the aqueous solution as the monohydrate (when considerable alcohol is present precipitation may be incomplete. Under such conditions it is advisable to distil off the alcohol solvent).

The precipitated monohydrate product need not be purified for further synthesis. However, if desired the hydrate may be recrystallized from aqueous ethanol. The crude reaction product is then carboxymethylated according to the process of my prior Patents Nos. 2,387,735 and 2,407,645 with NaCN and $CH_2O$ using about 80% tertiary butyl alcohol as the solvent and keeping the temperature just below the boiling point of the mixture. The product, which is primarily the di-substituted ethylene diamine diacetic acid may be obtained by crystallization from dilute aqueous HCl solution after removal of the tertiary butyl alcohol by distillation. It has the following structure:

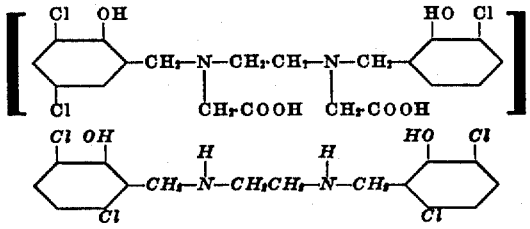

I prefer to use it, however, in the form of its alkali metal salt (somewhat water soluble) directly as obtained from the reaction mixture. It is a strong chelating agent for heavy metal ions.

These compounds are particularly useful, as germicides, fungicides and/or sterilizing and stabilizing agents (antioxidants) in oily and hydrocarbon systems and emulsions or where it is desired to introduce the water soluble salt but precipitate the complex from aqueous solution. The aromatic group also may act as plasticizer in rubber, synthetic rubber. Then the entire molecule follows a stabilizer and plasticizer.

EXAMPLE VI

Two moles of p-chlorophenyl-n-pentyl amine is reacted in 50% aqueous ethanol with trimethylene dichloride by the gradual addition of one mole of the dichloride (dissolved in ethanol) to the reaction mixture kept at reflux temperature. The reaction mixture is maintained alkaline by the addition of one mole of $Na_2CO_3$ during the reaction. For best results, the addition of dichloride should be made slowly (about 5 hours or more) and the resulting diamine is obtained as a precipitate (probably a hydrate) after evaporation of the alcohol and cooling of the aqueous reaction mixture. Yield: about 80% of This material may be converted to the desired chelating agent by substitution of two acetic acid (or salt) groups on the amino hydrogens. This may be done by a number of methods; carboxymethylation using [$NaCH_2$] *NaCN* and $CH_2O$, treatment with sodium chloroacetate, or [use] by the familiar nitrile method (Strecker synthesis using formaldehyde). The carboxymethylation reaction seems to give best results, but requires a mixed organic aqueous solvent as in Example V. The resulting disubstituted [ethylene] *trimethylene* diamine diacetic acid is insoluble in water and may be obtained by acidification of an aqueous solution of its salts. It has the formula:

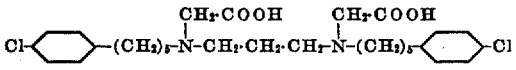

In addition to having strong chelating properties, it is surface active (as its salts) in aqueous solutions, is a germicide, and the acid and its metal chelates are soluble in polar and non-polar organic solvents.

It is believed apparent from the above disclosure of genus and species compounds falling within the scope of the invention that the di-(substituted phenyl)-di-alkylene substituted alkylene diaminediacetic acid compounds of the present invention form a definite group of compounds whose chemical properties are closely similar and analogous though varying somewhat in degree. An analogous series of compounds are obtained [where] *when* the acetic acid groups are replaced by an acetic acid analogue but the chelate-forming properties of the compounds decrease as the carboxylic groups is moved further away from the amino nitrogen by intervening groups. Therefore, I prefer to employ the acetic acid group compounds for the chelating agents of the present invention.

The bactericidal and germicidal properties of these compounds are due to the halogenated phenyl groups which are substituted in the alkylene groups displacing the amino hydrogens of the base alkylene polyamine diacetic acid, the intervening alkylene group spacing the halogenated phenyl groups remote from the amino nitrogen sufficiently to permit same to function as solubilizing groups in aqueous and organic solvent solutions. In these phenyl groups at least one of the hydrogens in the aromatic nucleus must be displaced by a halogen, preferably chlorine, for bactericidal action.

Having hereinabove described the invention generically and specifically and given several specific examples of the same to illustrate the generic scope thereof it is believed apparent that the compounds may be widely varied structurally without essential departure from the invention and all such are contemplated as may fall within the scope of the following claims.

What is claimed is:

1. A compound conforming to the following formula:

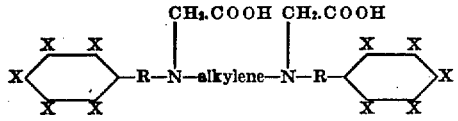

wherein R is an alkylene group containing from 1 to 5 carbon atoms, alkylene is one of the group consisting of $$—CH_2.CH_2—$$

$$—CH_2.CH_2.CH_2—$$

and $$—CH(CH_3).CH_2—$$

and X is a member of the group consisting of hydrogen, hydroxyl, alkyl, alkoxyl, and halogen, with from one to three of the X groups being halogen, *and the alkali metal, ammonium and amine salts thereof.*

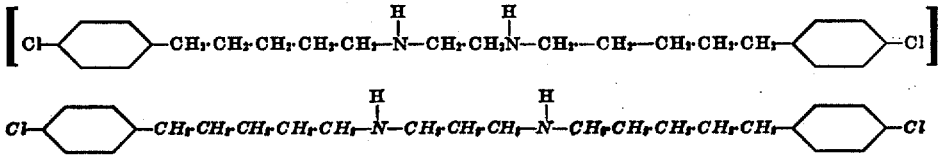

2. The compound conforming to the structure:

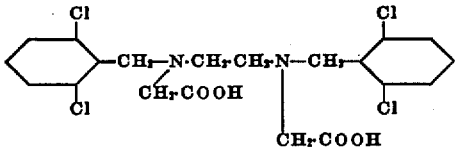

3. The compound conforming to the structure:

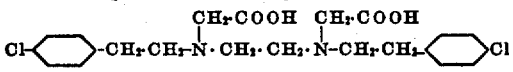

4. The compound conforming to the structure:

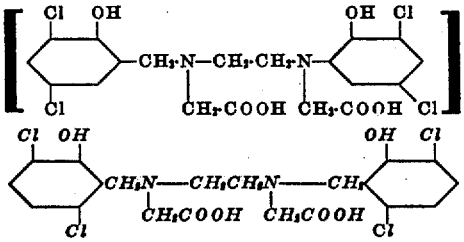

5. The compound conforming to the following structure:

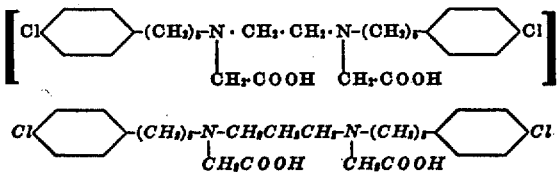

6. The compound conforming to the structure:

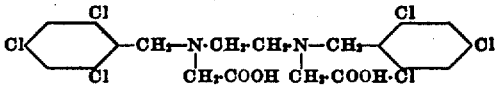

References Cited in the file of this patent or the original patent

UNITED STATES PATENTS

| Number | Name | Date |
|---|---|---|
| 868,294 | Schmidlin | Oct. 15, 1907 |
| 2,195,974 | Reppe et al. | Apr. 2, 1940 |
| 2,489,363 | Bersworth | Nov. 29, 1949 |
| 2,539,212 | Strobel et al. | Jan. 23, 1951 |

FOREIGN PATENTS

| Number | Country | Date |
|---|---|---|
| 18,095 | Great Britain | of 1913 |
| 642,244 | Germany | Mar. 6, 1937 |

OTHER REFERENCES

Alphen: Chem. Abs., vol. 38, col. 4943 (1944).

Bischoff et al.: Beilstein (Handbuch, 4th ed.), vol. 12, p. 547 (1929).